(12) United States Patent
Sassi et al.

(10) Patent No.: US 12,060,950 B2
(45) Date of Patent: Aug. 13, 2024

(54) VALVE ASSEMBLY AND HYDRAULIC CIRCUIT

(71) Applicant: Dana Motion Systems Italia S.R.L., Reggio Emilia (IT)

(72) Inventors: Alessandro Sassi, Reggio Emilia (IT); Vanni Catellani, Reggio Emilia (IT); Stefano Fasano, Reggio Emilia (IT); Federica Franzoni, Reggio Emilia (IT); Stefano Lazzaretti, Reggio Emilia (IT)

(73) Assignee: Dana Motion Systems Italia Srl, Reggio Emilia (IT)

( * ) Notice: Subject to any disclaimer, the term of this patent is extended or adjusted under 35 U.S.C. 154(b) by 60 days.

(21) Appl. No.: 18/149,346

(22) Filed: Jan. 3, 2023

(65) Prior Publication Data

US 2023/0235835 A1   Jul. 27, 2023

(30) Foreign Application Priority Data

Jan. 10, 2022   (DE) .................... 20 2022 100 104.9

(51) Int. Cl.
*F16K 31/363* (2006.01)
*B66D 1/08* (2006.01)
*F15B 13/02* (2006.01)

(52) U.S. Cl.
CPC ............. *F16K 31/363* (2013.01); *B66D 1/08* (2013.01); *F15B 13/02* (2013.01)

(58) Field of Classification Search
CPC .......... F16K 31/363; F15B 2211/20553; F15B 2211/763
See application file for complete search history.

(56) References Cited

U.S. PATENT DOCUMENTS

| | | | |
|---|---|---|---|
| 3,608,435 | A | 9/1971 | Conabee et al. |
| 3,811,282 | A | 5/1974 | Schexnayder |
| 4,275,643 | A | 6/1981 | Knowles |
| 4,320,691 | A | 3/1982 | McWilliams |
| 4,462,571 | A | 7/1984 | Fox |
| 5,606,993 | A | 3/1997 | Stoll |
| 6,467,553 | B1 | 10/2002 | Wojanis |
| 8,820,345 | B2 | 9/2014 | Gergaud et al. |

FOREIGN PATENT DOCUMENTS

DE   202005015923 U1   12/2005

*Primary Examiner* — Kenneth Bomberg
*Assistant Examiner* — Daniel S Collins
(74) *Attorney, Agent, or Firm* — Marshall & Melhorn, LLC

(57) ABSTRACT

A valve assembly and a hydraulic circuit including the valve assembly are provided. The valve assembly comprises a hydraulically actuated valve configured to be biased from a first control position to a second control position by a hydraulic pressure applied to a first fluid port of the hydraulically actuated valve. A first switching threshold pressure required to switch the hydraulically actuated valve to its second control position when applied to the first fluid port of the hydraulically actuated valve in its first control position differs from a second switching threshold pressure required to keep the hydraulically actuated valve in its second control position when applied to the first fluid port of the hydraulically actuated valve in its second control position.

20 Claims, 1 Drawing Sheet

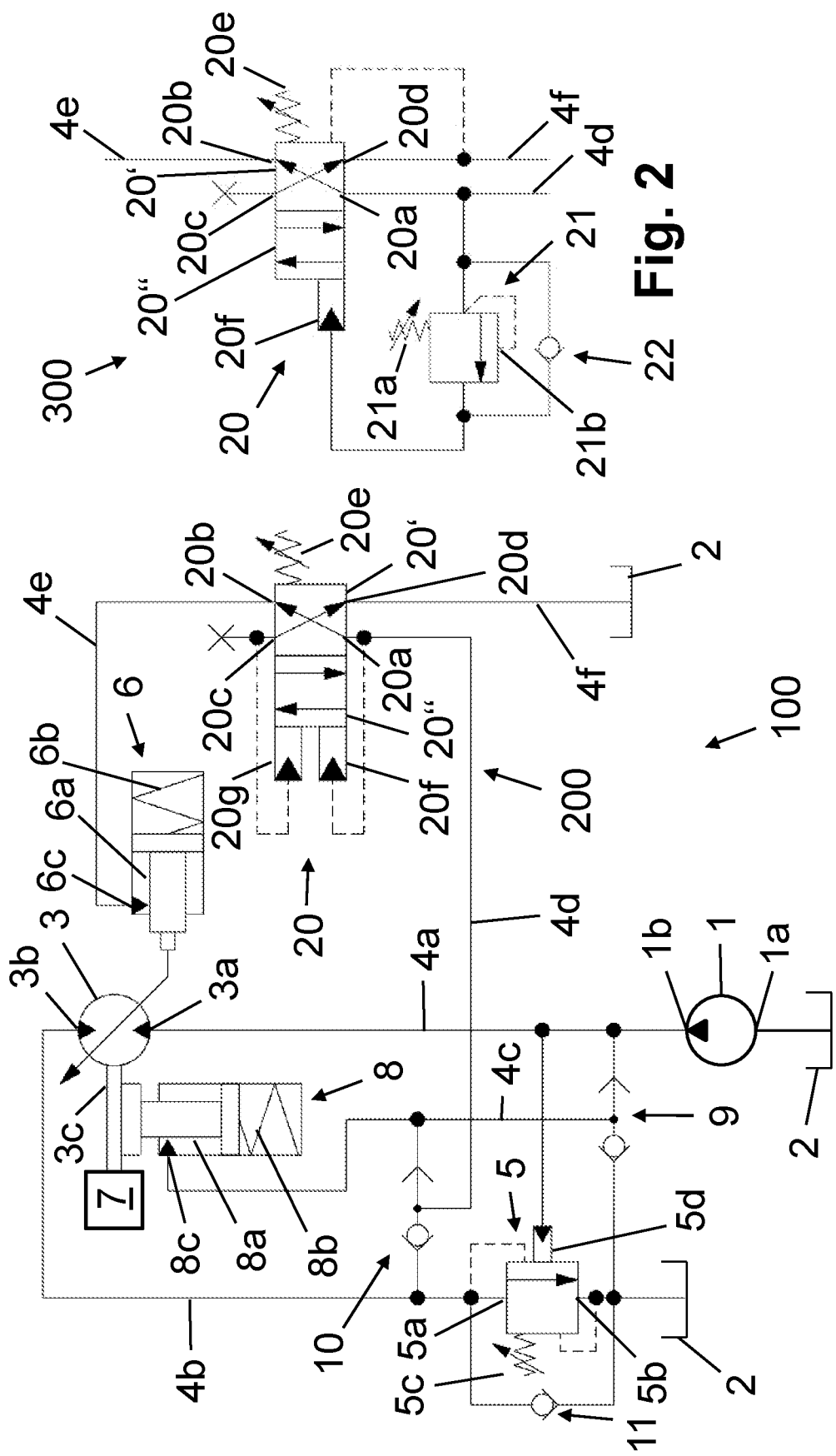

VALVE ASSEMBLY AND HYDRAULIC CIRCUIT

The present disclosure relates to a valve assembly and to a hydraulic circuit including said valve assembly. The valve assembly and the hydraulic circuit of the presently proposed type may be used for driving and/or controlling hydraulic implements such as winches, for example.

Hydraulic circuits for driving and/or controlling hydraulic implements such as winches often include one or more hydraulically actuated valves which can be switched from a first control position to a second control position by applying a hydraulic pilot pressure to the hydraulically actuated valve. However, in many cases switching the hydraulically actuated valve from the first control position to the second control position elicits pressure variations in the hydraulic circuit which may act back on the hydraulically actuated valve and which may impair its controllability.

Thus, there is demand for a valve assembly including a hydraulically actuated valve with improved controllability, and for a hydraulic circuit including such a valve assembly.

This problem is solved by a valve assembly including the features of claim 1 and by a hydraulic circuit including said valve assembly. Special embodiments are described in the dependent claims.

The presently proposed valve assembly comprises:
a hydraulically actuated valve configured to be biased from a first control position to a second control position by a hydraulic pressure applied to a first fluid port of the hydraulically actuated valve,
wherein the valve assembly is configured such that a first switching threshold pressure required to switch the hydraulically actuated valve to its second control position when applied to the first fluid port of the hydraulically actuated valve in its first control position differs from a second switching threshold pressure required to keep the hydraulically actuated valve in its second control position when applied to the first fluid port of the hydraulically actuated valve in its second control position. Within the scope of the document the term fluid may include or may relate to a liquid such as oil.

Due to the fact that the first switching threshold pressure required to be applied to the first fluid port of the hydraulically actuated valve switch the hydraulically actuated valve from the first control position to the second control position differs from the second switching threshold pressure required to be applied to the first fluid port of the hydraulically actuated valve to keep the hydraulically actuated valve in the second control position, the controllability of the valve assembly can be improved with respect to known valve assemblies.

The valve assembly may be configured such that the first switching threshold pressure is higher than the second switching threshold pressure.

The hydraulically actuated valve may comprises a biasing member biasing the hydraulically actuated valve to its first control position. The hydraulically actuated valve may then be configured such that a biasing force exerted by the biasing member of the hydraulically actuated valve and biasing the hydraulically actuated valve to its first control position is adjustable.

The hydraulically actuated valve may comprises a second fluid port. The hydraulically actuated valve may be configured such that when the hydraulically actuated valve is in the first control position, the first fluid port of the hydraulically actuated valve and the second fluid port of the hydraulically actuated valve are fluidly connected to one another. And the hydraulically actuated valve may be configured such that when the hydraulically actuated valve is in the second control position, the first fluid port of the hydraulically actuated valve and the second fluid port of the hydraulically actuated valve are fluidly isolated from one another.

The hydraulically actuated valve may comprise at least one hydraulic valve actuator fluidly connected or fluidly connectable to the first fluid port of the hydraulically actuated valve and configured to bias the hydraulically actuated valve to its second control position. The hydraulically actuated valve may be configured such that when the hydraulically actuated valve is in the second control position, a hydraulic pressure equal to or higher than the second switching threshold pressure applied to the at least one hydraulic valve actuator of the hydraulically actuated valve keeps the hydraulically actuated valve in its second control position.

The at least one hydraulic valve actuator of the hydraulically actuated valve may comprise at least one first hydraulic valve actuator and at least one second hydraulic valve actuator, the at least one first hydraulic valve actuator and the at least one second hydraulic valve actuator of the hydraulically actuated valve configured to bias the hydraulically actuated valve to its second control position. The hydraulically actuated valve may then be configured such that in one of the first control position and the second control position of the hydraulically actuated valve only the at least one first hydraulic valve actuator or only the at least one second hydraulic valve actuator of the hydraulically actuated valve is fluidly connected to the first fluid port of the hydraulically actuated valve, and that in the other of the first control position and the second control position of the hydraulically actuated valve the at least one first hydraulic valve actuator and the at least one second hydraulic valve actuator of the hydraulically actuated valve are fluidly connected to the first fluid port of the hydraulically actuated valve.

More specifically, the hydraulically actuated valve may be configured such that in the first control position of the hydraulically actuated valve the at least one first hydraulic valve actuator of the hydraulically actuated valve is fluidly connected to the first fluid port of the hydraulically actuated valve and the at least one second hydraulic valve actuator of the hydraulically actuated valve is fluidly isolated from the first fluid port of the hydraulically actuated valve, and that in the second control position of the hydraulically actuated valve the at least one first hydraulic valve actuator and the at least one second hydraulic valve actuator of the hydraulically actuated valve are fluidly connected to the first fluid port of the hydraulically actuated valve.

The at least one hydraulic valve actuator of the hydraulically actuated valve may comprise a plurality of hydraulic valve actuators, each of the plurality of hydraulic valve actuators of the hydraulically actuated valve configured to bias the hydraulically actuated valve to its second control position. The hydraulically actuated valve may then further be configured such that in one of its first control position and its second control position only a first non-zero number of the plurality of hydraulic valve actuators of the hydraulically actuated valve is fluidly connected to the first fluid port of the hydraulically actuated valve, and that in the other of its first control position and its second control position only a second non-zero number of the plurality of hydraulic valve actuators of the hydraulically actuated valve is fluidly connected to the first fluid port of the hydraulically actuated valve, wherein the first non-zero number is greater than the second non-zero number.

For example, the at least one hydraulic valve actuator of the hydraulically actuated valve may comprise a first hydraulic valve actuator and a second hydraulic valve actuator, each of the first hydraulic valve actuator and the second hydraulic valve actuator of the hydraulically actuated valve configured to bias the hydraulically actuated valve to its second control position. The hydraulically actuated valve may then be configured such that in the first control position of the hydraulically actuated valve the first hydraulic valve actuator of the hydraulically actuated valve is fluidly connected to the first fluid port of the hydraulically actuated valve and the second hydraulic valve actuator of the hydraulically actuated valve is fluidly isolated from the first fluid port of the hydraulically actuated valve, and that in the second control position of the hydraulically actuated valve the first hydraulic valve actuator and the second hydraulic valve actuator of the hydraulically actuated valve are fluidly connected to the first fluid port of the hydraulically actuated valve.

The hydraulically actuated valve may comprise a third fluid port. The hydraulically actuated valve may be configured such that when the hydraulically actuated valve is in the first control position, the first fluid port of the hydraulically actuated valve is fluidly connected to the second hydraulic valve actuator of the hydraulically actuated valve via the third fluid port of the hydraulically actuated valve.

The valve assembly may comprise a pressure relief valve selectively fluidly connecting the first fluid port of the hydraulically actuated valve to the at least one hydraulic valve actuator of the hydraulically actuated valve. For example, the pressure relief valve may be configured to fluidly connect the first fluid port of the hydraulically actuated valve to the at least one hydraulic valve actuator of the hydraulically actuated valve when a pressure at the first fluid port of the hydraulically actuated valve reaches or exceeds the first switching threshold pressure. And the pressure relief valve may be configured such that it blocks a flow of fluid between the first fluid port of the hydraulically actuated valve and the at least one hydraulic valve actuator of the hydraulically actuated valve when a pressure at the first fluid port of the hydraulically actuated valve is below the first switching threshold pressure.

The pressure relief valve may comprise a biasing member biasing the pressure relief valve to a closed position in which the pressure relief valve blocks a fluid flow between the first fluid port of the hydraulically actuated valve and the at least one hydraulic valve actuator of the hydraulically actuated valve through the pressure relief valve. The pressure relief valve may then further be configured such that a biasing force exerted by the biasing member of the pressure relief valve and biasing the pressure relief valve to its closed position is adjustable.

The valve assembly may comprise a one-way valve selectively fluidly connecting the first fluid port of the hydraulically actuated valve to the at least one hydraulic valve actuator of the hydraulically actuated valve, for example in parallel to the pressure relief valve. The one-way valve may be configured to allow a fluid flow through the one-way valve from the at least one hydraulic valve actuator of the hydraulically actuated valve toward the first fluid port of the hydraulically actuated valve, and to block a fluid flow through the one-way valve from the first fluid port of the hydraulically actuated valve toward the at least one hydraulic valve actuator of the hydraulically actuated valve.

Further, a hydraulic circuit is presently proposed which comprises the above-described valve assembly. The hydraulic circuit may comprise a hydraulic actuator such as a hydraulic cylinder which is fluidly connected or fluidly connectable to the hydraulically actuated valve, for example to the second fluid port of the hydraulically actuated valve. Additionally or alternatively, the hydraulic circuit may comprise a pressure source fluidly connected or fluidly connectable to the first fluid port of the hydraulically actuatable valve.

The hydraulic circuit may comprise a variable displacement hydraulic motor. The hydraulic actuator may then be configured to control or to vary the hydraulic displacement of the variable displacement hydraulic motor. For example, the variable displacement hydraulic motor may be a two-speed hydraulic motor. The hydraulic actuator may then be configured to discretely switch the two-speed hydraulic motor between a first hydraulic displacement and a second hydraulic displacement different from the first hydraulic displacement.

The hydraulic actuator and the variable displacement hydraulic motor may be configured such that the hydraulic displacement of the variable displacement hydraulic motor is configured to be decreased by applying a hydraulic pressure equal to or above a servo threshold pressure to the hydraulic actuator, for example via the second fluid port of the hydraulically actuated valve. For example, the servo threshold pressure may be equal to and/or higher than the second switching threshold pressure required to keep the hydraulically actuated valve in its second control position.

The hydraulic circuit may comprise at least one shuttle valve. The variable displacement hydraulic motor may have a first fluid port and a second fluid port. The first fluid port of the hydraulically actuated valve may then be fluidly connected or selectively fluidly connected to the first fluid port of the variable displacement hydraulic motor and to the second fluid port of the variable displacement hydraulic motor via the at least one shuttle valve. The at least one shuttle valve may then be configured to fluidly connect the first fluid port of the hydraulically actuated valve to a maximum pressure of a pressure at the first fluid port of the variable displacement hydraulic motor and a pressure at the second fluid port of the variable displacement hydraulic motor.

The hydraulic circuit may comprise a work unit such as a winch. For example, the variable displacement hydraulic motor may be configured to drive the work unit.

Embodiments of the presently proposed valve assembly and hydraulic circuit are described in the following detailed description and are depicted in the accompanying drawing in which FIG. 1 schematically shows a hydraulic circuit comprising a valve assembly including a hydraulically actuated valve according to a first embodiment, and FIG. 2 schematically shows a hydraulic circuit comprising a valve assembly including a hydraulically actuated valve according to a second embodiment.

FIG. 1 schematically shows a hydraulic circuit 100. The hydraulic circuit 100 comprises a pressure source 1 such as a hydraulic pump having a first fluid port 1a in fluid communication with a fluid tank 2, and a second fluid port 1b. The pressure source 1 may have a variable hydraulic displacement. As is well known in the art of hydraulics, the displacement of a hydraulic unit such as a hydraulic pump or motor is usually defined as the volume of liquid displaced by the hydraulic unit upon a complete turn of a drive shaft or of a driven shaft of the hydraulic unit. The hydraulic circuit 100 further comprises a hydraulic motor 3 having a first fluid port 3a and a second fluid port 3b. The pressure source 1 is fluidly connected or fluidly connectable to the hydraulic motor 3 for driving the hydraulic motor 3. More specifically, the second fluid port 1b of the pressure source 1 is fluidly connected or fluidly connectable to the first fluid port 3a of the hydraulic motor 3, for example via a fluid line 4a. The hydraulic circuit 100 may further comprise a pressure relief valve 5. The second fluid port 3b of the hydraulic motor 3 may be fluidly connected or fluidly connectable to the fluid tank 2, for example via a fluid line 4b and the pressure relief valve 5. In the figures, connections between fluid lines are indicated by a black dot. Where an intersection between two intersecting fluid lines is not explicitly marked by a black dot, these fluid lines are not intended to be fluidly connected to one another at the intersection.

The hydraulic motor 3 may be a variable displacement hydraulic motor. More specifically, in the embodiment depicted here, the hydraulic motor 3 may be a two-speed hydraulic motor which may be discretely switched or which may only be discretely switched between a first hydraulic displacement and a second hydraulic displacement, wherein the first hydraulic displacement of the hydraulic motor 3 is different from the second hydraulic displacement of the hydraulic motor 3. However, it is understood that in alternative embodiments of the hydraulic circuit 100 not depicted here the hydraulic motor 3 may have a continuously variable displacement rather than a discretely variable hydraulic displacement.

Here, the pressure relief valve 5 has a first fluid port 5a fluidly connected to the second fluid port 3b of the hydraulic motor 3, and a second fluid port 5b fluidly connected to the fluid tank 2. The pressure relief valve 5 may include a biasing member 5c such as a spring or another elastic element biasing the pressure relief valve 5 to a closed position in which the pressure relief valve 5 blocks a flow of fluid between the second fluid port 3b of the hydraulic motor 3 and the fluid tank 2 via the pressure relief valve 5. And the pressure relief valve 5 may include a hydraulic actuator 5d fluidly connected to the second fluid port 1b of the pressure source 1 and to the first fluid port 3a of the hydraulic motor 3 and configured to bias the pressure relief valve 5 against the biasing member 5c and to an open position in which the pressure relief valve 5 allows a flow of fluid between the second fluid port 3b of the hydraulic motor 3 and the fluid tank 2 via the pressure relief valve 5. For example, the pressure relief valve 5 may prevent cavitation in the hydraulic motor 3 by moving to the closed position when a pressure produced at the second fluid port 1b of the pressure source 1 is below a predetermined threshold pressure required to drive the hydraulic motor 3.

The hydraulic circuit 100 may further comprise a one-way valve or check valve 11 selectively fluidly connecting the fluid ports 5a, 5b of the pressure relief valve 5. The one-way valve 11 may be configured to allow a flow of fluid from the fluid tank 2 towards the second fluid port 3b of the hydraulic motor 3 through the one-way valve 11, and to block a flow of fluid from the second fluid port 3b of the hydraulic motor 3 toward the fluid tank 2 through the one-way valve 11. In other words, the one-way valve 11 may allow a flow of fluid from the fluid tank 2 toward the hydraulic motor 3 to bypass the pressure relief valve 5.

In the embodiment depicted here, the hydraulic circuit 100 further comprises a hydraulic actuator 6 configured to control the hydraulic displacement of the hydraulic motor 3. For example, the hydraulic actuator 6 may comprise a hydraulic cylinder which may be integrated with the hydraulic motor 3. The hydraulic actuator 6 may comprise a piston or servo piston 6a. For instance, the piston 6a may be coupled to a swashplate of the variable displacement hydraulic motor 3 so that the hydraulic displacement of the hydraulic motor 3 may be changed by moving the piston 6a. And the hydraulic actuator 6 may comprise a biasing member 6b such as a spring or another elastic element for biasing the piston 6a. For instance, the hydraulic actuator 6 and the hydraulic motor 3 may be configured such that the biasing member 6b biases the piston 6a to a large displacement position in which the hydraulic displacement of the hydraulic motor 3 takes on its maximum value. And the hydraulic actuator 6 and the hydraulic motor 3 may be configured such that the hydraulic displacement of the hydraulic motor 3 may be decreased by pressurizing the hydraulic actuator 6, thereby forcing the piston 6a against a biasing force exerted by the biasing member 6b. For instance, the hydraulic actuator 6 may comprise a fluid port 6c and may be pressurized via the fluid port 6c. More specifically, the hydraulic actuator 6 and the hydraulic motor 3 may be configured such that when, once or as long as a hydraulic pressure applied to the hydraulic actuator 6 is below a servo threshold pressure, the biasing member 6b forces the piston to the large displacement position. And the hydraulic actuator 6 and the hydraulic motor 3 may be configured such that when, once or as long as a hydraulic pressure applied to the hydraulic actuator 6 is equal to or above the servo threshold pressure, the piston 6a is forced to a small displacement position in which the hydraulic displacement of the hydraulic motor 3 takes on its minimum value.

The hydraulic circuit 100 may further comprise a work unit 7 such as a winch driven by or configured to be driven by the hydraulic motor 3, for example via an output shaft 3c of the hydraulic motor 3. However, it is understood that in alternative embodiments of the hydraulic circuit 100 not depicted here the work unit 7 may comprise implements other than a winch.

The hydraulic circuit 100 may further comprise another hydraulic actuator 8. For instance, the hydraulic actuator 8 may comprise a hydraulic cylinder including a piston 8a configured to selectively brake the hydraulic motor 3 or the output shaft 3c of the hydraulic motor 3. For example, the hydraulic actuator 8 may comprise a biasing member 8b such as a spring or another elastic element biasing the piston 8a to a braking position in which the piston 8a brakes the hydraulic motor 3 or the output shaft 3c of the hydraulic motor 3. The hydraulic actuator 8 may comprise a fluid port 8c, and the piston 8a may be biased to a non-braking position in which the piston 8a does not brake the hydraulic motor 3 or the output shaft 3c of the hydraulic motor 3 by pressurizing the hydraulic actuator 8 via the fluid port 8c. More specifically, the hydraulic actuator 8 may be configured such that when, once or as long as a hydraulic pressure applied to the hydraulic actuator 8 is below a braking threshold pressure, the biasing member 8b forces the piston 8a to a braking position. And the hydraulic actuator 8 may be configured such that when, once or as long as a hydraulic pressure applied to the hydraulic actuator 8 is equal to or above the braking threshold pressure, the piston 8a is forced to a non-braking position.

In the embodiment depicted in FIG. 1, the fluid port 8c of the hydraulic actuator 8 is fluidly connected to a first shuttle valve 9 via a fluid line 4c. The first shuttle valve 9 may be configured to fluidly connect the fluid port 8c of the hydraulic actuator 8 to the maximum pressure of a pressure at the second fluid port 1b of the pressure source 1 (or, equivalently, a pressure at the first fluid port 3a of the hydraulic motor 3) and a pressure the second fluid port 5b of the pressure relief valve 5. Additionally or alternatively, the hydraulic circuit 100 may comprise a non-hydraulically operated brake (not shown) for braking the hydraulic motor and/or the work unit 7 independently of a hydraulic pressure in the hydraulic circuit 100.

In embodiments where the work unit 7 includes a winch, the winch may be used to hoist or lift a load by pressurizing the first fluid port 3a of the hydraulic motor 3, thereby causing fluid to flow through the hydraulic motor 3 from the first fluid port 3a to the second fluid port 3b. And the winch may be used to lower a load by allowing fluid to flow from the fluid tank 2 to the second fluid port 3b of the hydraulic motor 3, for example via the one-way valve 11, through the hydraulic motor 3 from the second fluid port 3b to the first fluid port 3a, and from the first fluid port 3a back to the fluid tank 2. A gravitational force or pull exerted by the load typically creates a hydraulic pressure acting on the second fluid port 3b of the hydraulic motor 3.

The hydraulic circuit 100 further comprises a valve assembly 200. In the embodiment depicted here, the valve assembly 200 is configured to selectively fluidly connect the hydraulic actuator 6 to either one of the fluid ports 3a, 3b of the hydraulic motor and/or to the pressure source 1, or to the fluid tank 2. The valve assembly 200 comprises a hydraulically actuated valve 20 which can be switched between a first control position 20' and a second control position 20'. In the following the hydraulically actuated valve 20 will be referred to as the valve 20 for simplicity. The valve 20 has four fluid ports 20a, 20b, 20c, 20d. The valve 20 comprises a biasing member 20e such as a spring or another elastic element biasing the valve 20 to the first control position 20'. In some embodiments, a biasing force exerted by the biasing member 20e can be adjustable. The valve 20 further comprises a first hydraulic valve actuator 20f fluidly connected to the first fluid port 20a of the valve 20 and configured to bias the valve 20 to its second control position 20", and a second hydraulic valve actuator 20g fluidly connected to the third fluid port 20c of the valve 20 and likewise configured to bias the valve 20 to its second control position 20"

In the embodiment depicted in FIG. 1, the hydraulic circuit 100 further includes a second shuttle valve 10. The first fluid port 20a of the valve 20 may then be fluidly connected to the second shuttle valve 10, for example via a fluid line 4d. As shown in FIG. 1, the second shuttle valve 10 may be configured to fluidly connect the first fluid port 20a of the valve 20 to the maximum pressure of a pressure in the previously described fluid line 4c and a pressure at the second fluid port 3b of the hydraulic motor 3. That is, the shuttle valves 9, 10 may be configured to fluidly connect the first fluid port 20a of the valve 20 to the maximum pressure of a pressure at the first fluid port 1a of the hydraulic motor 3 (or, equivalently, at the second fluid port 1b of the pressure source 1) and a pressure at the second fluid port 3b of the hydraulic motor 3.

In the embodiment depicted in FIG. 1, the second fluid port 20b of the valve 20 is fluidly connected to the hydraulic actuator 6. For example, the second fluid port 20b of the valve 20 may be fluidly connected to the fluid port 6c of the hydraulic actuator 6 via a fluid line 4e. Again, the third fluid port 20c of the valve 20 is fluidly connected to the second hydraulic valve actuator 20g of the valve 20. And the fourth fluid port 20d of the valve 20 is fluidly connected to the fluid tank 2.

FIG. 1 shows the valve 20 is in its first control position 20'. In the first control position 20', the first fluid port 20a and the second fluid port 20b of the valve 20 are fluidly connected to one another, the third fluid port 20c and the fourth fluid port 20d of the valve 20 are fluidly connected to one another, and the first and second fluid port 20a, 20b are fluidly isolated from the third and the fourth fluid port 20c, 20d. Or in other words, in the first control position 20' of the valve 20, the hydraulic actuator 6 may be pressurized via the first fluid port 20a of the valve 20.

In the second control position 20" of the valve 20 on the other hand, the first fluid port 20a and the third fluid port 20c of the valve 20 are fluidly connected to one another, the second fluid port 20b and the fourth fluid port 20d of the valve 20 are fluidly connected to one another, and the first and third fluid port 20a, 20c are fluidly isolated from the second and the fourth fluid port 20b, 20d. Or in other words, in the second control position 20" of the valve 20, the hydraulic actuator 6 is fluidly connected to the fluid tank 2 and may not be pressurized via the first fluid port 20a of the valve 20.

The valve 20 is configured such that when no hydraulic pressure is applied to the hydraulic valve actuators 20f, 20e via the first fluid port 20a, such as when the pressure source 1 is turned off and/or when the hydraulic actuator 8 brakes the hydraulic motor 3, the biasing member 20e forces or switches the valve 20 to its first control position 20'. When the valve 20 is in its first control position 20', the first valve actuator 20f is fluidly connected to the first fluid port 20a and the second valve actuator 20g is fluidly isolated from the first fluid port 20a. That is, when the valve 20 is in the first control position 20', only the first valve actuator 20f may be pressurized via the first fluid port 20a and may bias the valve 20 to the second control position 20".

The valve 20, and in particular the first hydraulic valve actuator 20f and the biasing member 20e, is/are further configured such that when the valve 20 is in its first control position 20' and a hydraulic pressure applied to the first hydraulic valve actuator 20f via the first fluid port 20a is below a first switching threshold pressure, the valve 20 remains in its first control position 20'. And the valve 20, and in particular the first hydraulic valve actuator 20f and the biasing member 20e, is/are configured such that when the valve 20 is in its first control position 20' and a hydraulic pressure applied to the first hydraulic valve actuator 20f via the first fluid port 20a is equal to or above the first switching threshold pressure, the first valve actuator 20f forces or switches the valve 20 to its second control position 20', against the biasing force exerted by the biasing member 20e. Importantly, when the valve 20 is in its second control position 20", both hydraulic valve actuators 20f, 20g are fluidly connected to the first fluid port 20a. That is, when the valve 20 is in the second control position 20", both hydraulic valve actuators 20f, 20g may be pressurized via the first fluid port 20a and may bias the valve 20 to the second control position 20".

The valve 20, and in particular the hydraulic valve actuators 20f, 20g and the biasing member 20e, is/are further configured such that when the valve 20 is in its second control position 20" and a hydraulic pressure applied to the hydraulic valve actuators 20f, 20g via the first fluid port 20a is equal to or above a second switching threshold pressure, the valve 20 remains in its second control position 20". And the valve 20, and in particular the hydraulic valve actuators 20f, 20g and the biasing member 20e, is/are configured such that when the valve 20 is in its second control position 20" and a hydraulic pressure applied to the hydraulic valve actuators 20f, 20g via the first fluid port 20a is below the second switching threshold pressure, the biasing member 20e forces or switches the valve 20 to its first control position 20', against an actuator force exerted by or via the hydraulic valve actuators 20f, 20g.

Since in the first control position 20' of the valve 20 only the first hydraulic valve actuator 20f may be pressurized via the first fluid port 20a to bias the valve 20 to the second control position 20" whereas in the second control position 20" of the valve 20 both hydraulic valve actuators 20f, 20g may be pressurized via the first fluid port 20a to bias the valve 20 to the second control position 20", the first switching threshold pressure which has to be applied to the first fluid port 20a to switch the valve 20 from the first control position 20' to the second control position 20" is higher than the second switching threshold pressure which has to be applied to the first fluid port 20a to keep the valve 20 in its second control position 20". For example, from the above description and definitions it follows that $p_1 \cdot A_1 = p_2 \cdot (A_1 + A_2)$, or, equivalently, $p_1/p_2 = 1 + (A_2/A_1)$, wherein $p_1$ is the first switching threshold pressure, $p_2$ is the second switching threshold pressure, $A_1$ is the active area of the first hydraulic valve actuator 20f, and $A_2$ is the active area of the second hydraulic valve actuator 20g.

The above-mentioned servo threshold pressure required to move the piston 6a of the hydraulic actuator 6 against the biasing force exerted on the piston 6a by the biasing member 6b may be lower than the first switching threshold pressure which has to be applied to the first fluid port 20a of the valve 20 in order to switch the valve 20 from its first control position 20' to its second control position 20". Also, the servo threshold pressure may be lower than the second switching threshold pressure. Only by way of example, the servo threshold pressure may be at most 25 bar, the second switching threshold pressure may be between 40 bar and 60 bar, and the first switching threshold pressure may be between 80 bar and 120 bar. However, it is understood that the servo threshold pressure, the first switching threshold pressure and the second switching threshold pressure may assume other pressure values than those mentioned here.

In the following, the functionality of the hydraulic circuit 100 including the valve assembly 200 will be described, in particular with respect to an embodiment where the work unit 7 includes or is configured as a winch.

For example, when the pressure source 1 is turned off and the hydraulic actuator 8 brakes the hydraulic motor 8 such that no pressure is applied to the first fluid port 20a of the valve 20, the biasing member 20e forces the valve 20 to its first control position 20', the biasing member 6b of the hydraulic actuator 6 forces the piston 6a to its large displacement position, and the hydraulic displacement of the variable hydraulic motor 3 is set to large displacement.

When the pressure source 1 is then turned on, it creates a hydraulic pressure at its second fluid port 1b. The pressure source 1 pressurizes the first fluid port 3a of the hydraulic motor, the hydraulic actuator 8, the hydraulic actuator 6, the first hydraulic valve actuator 20f of the valve 20, and the hydraulic actuator 5d of the relief valve 5. Subsequently, the hydraulic pressure provided by the pressure source 1 opens the relief valve 5, moves the piston 8a of the hydraulic actuator 8 to a non-braking position and causes the hydraulic motor 3 to rotate, for example in order to hoist a load held by a rope or chain wound on the winch of the work unit 7. As the pressure source 1 increases the hydraulic pressure at its second fluid port 1b above the servo threshold pressure of the hydraulic actuator 6, the piston 6a of the hydraulic actuator 6 is forced to the small displacement position, setting the hydraulic displacement of the hydraulic motor 3 to small displacement. In particular when starting the pressure source 1 to accelerate mechanical components such as a winch drum from a standstill, reducing the displacement of the hydraulic motor 3 is often advantageous as it allows operating the pressure source 1 at lower torque. And as the pressure source 1 increases the hydraulic pressure at its second fluid port 1b further above the first switching threshold pressure of the valve 20, the first valve actuator 20f of the valve 20 forces or switches the valve 20 to its second control position 20".

Once the valve 20 has been switched to the second control position 20", it fluidly connects the hydraulic actuator 6 to the fluid tank 2, causing the hydraulic pressure acting on the piston 6a of the hydraulic actuator 6 to drop below the servo threshold pressure so that the biasing member 6b of the hydraulic actuator 6 pushes the piston 6a to the large displacement position, setting the hydraulic displacement of the hydraulic motor 3 to large displacement. The pressure source 1 may then continue to drive the hydraulic motor 3, for example at an operating pressure of at least 250 bar or of at least 300 bar.

The sudden increase in the hydraulic displacement of the hydraulic motor 3 upon switching the valve 20 to the second control position 20" may elicit a significant pressure drop in the hydraulic circuit 100, in particular at the first fluid port 20a of the valve 20. For example, in similar hydraulic circuits known from the prior art where a hydraulically actuated valve for controlling the hydraulic displacement of a hydraulic motor can be switched between different control positions using the same switching pressure in each of the different control positions, such sudden pressure changes in the switching pressure may result in malfunction of the circuit or in circuit damage.

The embodiment of the hydraulic circuit 100 depicted in FIG. 1 overcomes these drawbacks of known hydraulic circuits in that the valve assembly 200 features valve control positions with different switching threshold pressures. Specifically, due to the fact that the second switching threshold pressure required to keep the valve 20 in the second control position 20" is smaller than the first switching threshold pressure required to switch the valve 20 from the first control position 20' to the second control position 20", once the valve 20 has been switched to the second control position 20" it remains in the second control position 20" as long as pressure oscillations at the first fluid port 20a of the valve 20 have an amplitude which is smaller than the difference between the first switching threshold pressure and the second switching threshold pressure.

Subsequently, the hydraulic circuit 100 may be returned to the initial state described above in which the pressure source 1 is turned off, the hydraulic actuator 8 brakes the hydraulic motor 3, the hydraulic displacement of the hydraulic motor 3 is set to large displacement, the relief valve 5 is in the closed position, and the valve 20 is in the first control position 20'. To that end, the pressure source 1 may decrease or gradually decrease the hydraulic pressure provided at its second fluid port 1b. For example, as the pressure source 1 reduces the pressure at its second fluid port 1b and at the first fluid port 20a of the valve 20 below the second switching threshold pressure of e.g. 40 bar, the biasing member 20a forces or switches the valve 20 back to the first control position 20' in which the valve 20 fluidly connects the pressure source 1 to the hydraulic actuator 6, thereby at least temporarily forcing the piston 6a of the hydraulic actuator 6 to the small displacement position, and setting the hydraulic displacement of the hydraulic motor 3 to small displacement. As the pressure source 1 further reduces the pressure at its second fluid port 1b below the servo threshold pressure of the hydraulic actuator 6, the biasing member 6b again pushes the piston 6a to the large displacement position, setting the hydraulic displacement of the hydraulic motor 3 to large displacement. And as the pressure source 1 further reduces the pressure at its second fluid port 1b below the braking threshold pressure of the hydraulic actuator 8, the hydraulic actuator 8 brakes the hydraulic motor 3. Also, the relief valve 5 moves back to the closed position and the pressure source 1 may be turned off.

FIG. 2 schematically shows a valve assembly 300 which is a variation of the valve assembly 200 of FIG. 1. In the hydraulic circuit 100 of FIG. 1 the valve assembly 200 may be replaced by the valve assembly 300 of FIG. 2. In FIG. 2 recurring features already included in FIG. 1 are designated with the same reference signs. For simplicity, only those features of the valve assembly 300 of FIG. 2 which distinguish the valve assembly 300 from the valve assembly 200 of FIG. 1 will be described in detail.

Like the valve assembly 200 of FIG. 1, the valve assembly 300 of FIG. 2 comprises a hydraulically actuated valve 20. Again, the hydraulically actuated valve 20 of the valve assembly 300 of FIG. 2 will be referred to simply as valve 20 for brevity. Like the valve 20 of the valve assembly 200 of FIG. 1, the valve 20 of the valve assembly 300 of FIG. 2 can be switched between a first control position 20' and a second control position 20", has four fluid ports 20a, 20b, 20c, 20d, and a biasing member 20e such as a spring or another elastic element biasing the valve 20 to its first control position 20'. The valve 20 of FIG. 2 differs from the valve 20 of FIG. 1 in that the valve 20 of FIG. 2 has only a single hydraulic valve actuator 20f fluidly connected to the first fluid port 20a of the valve 20 and configured to bias the valve 20 to its second control position 20". Further, in the valve assembly 300 of FIG. 2 the third fluid port 20c of the valve 20 is plugged. The fact that the valve assembly 300 of FIG. 2 may replace the valve assembly 200 of FIG. 1 is indicated by the fact that the fluid ports 20a, 20b, 20d of the valve 20 of the valve assembly 300 of FIG. 2 are connected to the same fluid lines 4d, 4e, 4f as in the valve assembly 200 of FIG. 1.

The valve assembly 300 of FIG. 2 differs from the valve assembly 200 of FIG. 2 in that the valve assembly 300 of FIG. 2 comprises a pressure relief valve 21 and a one-way valve 22, each of the pressure relief valve 21 and the one-way valve 22 configured to selectively fluidly connect the first fluid port 20a of the valve 20 to the hydraulic valve actuator 20f, in parallel to one another.

The pressure relief valve 21 comprises a biasing member 21a such as a spring or another elastic element biasing the pressure relief valve 21 to a closed position in which the pressure relief valve 21 blocks a fluid flow between the first fluid port 20a of the valve 20 and the hydraulic valve actuator 20f of the valve 20 through the pressure relief valve 21, and a hydraulic actuator 21b fluidly connected to the first fluid port 20a of the valve 20 and configured to bias the pressure relief valve 21 to an open position in which the pressure relief valve 21 allows a fluid flow between the first fluid port 20a of the valve 20 and the hydraulic valve actuator 20f of the valve 20 through the pressure relief valve 21. More specifically, the pressure relief valve 21 is configured to move to the open position or to remain in the open position when, once or as long as a hydraulic pressure at the first fluid port 20a of the valve 20 reaches or exceeds the first switching threshold pressure. And the pressure relief valve 21 is configured to move to the closed position or to remain in the closed position when, once or as long as a hydraulic pressure at the first fluid port 20a of the valve 20 is below the first switching threshold pressure.

The one-way valve 22 is configured such that it allows a fluid flow through the one-way valve 22 from the hydraulic valve actuator 20f toward the first fluid port 20a of the valve 20, and to block a fluid flow through the one-way valve 22 from the first fluid port 20a of the valve 20 toward the hydraulic valve actuator 20f of the valve 20.

The valve 20 of FIG. 2, and in particular the first hydraulic valve actuator 20f and the biasing member 20e, is/are configured such that when the valve 20 is in its first control position 20' and a hydraulic pressure applied to the first hydraulic valve actuator 20f via the first fluid port 20a is below the first switching threshold pressure, the valve 20 remains in its first control position 20'. And the valve 20 of FIG. 2, and in particular the first hydraulic valve actuator 20f and the biasing member 20e, is/are configured such that when the valve 20 is in its first control position 20' and a hydraulic pressure applied to the first hydraulic valve actuator 20f via the first fluid port 20a is equal to or above the first switching threshold pressure, the first valve actuator 20f forces or switches the valve 20 to its second control position 20', against the biasing force exerted by the biasing member 20e.

The valve 20 of FIG. 2, and in particular the hydraulic valve actuator 20f and the biasing member 20e, is/are further configured such that when the valve 20 is in its second control position 20" and a hydraulic pressure applied to the hydraulic valve actuator 20f via the first fluid port 20a is equal to or above the second switching threshold pressure which is smaller than the first threshold pressure, the valve 20 remains in its second control position 20". And the valve 20 of FIG. 2, and in particular the hydraulic valve actuator 20f, 20g and the biasing member 20e, is/are configured such that when the valve 20 is in its second control position 20" and a hydraulic pressure applied to the hydraulic valve actuator 20f via the first fluid port 20a is below the second switching threshold pressure, the biasing member 20e forces or switches the valve 20 to its first control position 20', against an actuator force exerted by or via the hydraulic valve actuator 20f.

From the above description a person of ordinary skill readily understands that the valve assembly 300 of FIG. 2 has the same functionality as the valve assembly 200 of FIG. 1. When the valve 20 of the valve assembly 300 is in its first control position 20' and a hydraulic pressure equal to or above the first switching threshold pressure is applied to the first fluid port 20a of the valve 20, the pressure relief valve 21 moves to the open position and allows the hydraulic pressure applied to the first fluid port 20a of the valve 20 to act on the hydraulic valve actuator 20f of the valve 20 and to force or switch the valve 20 to its second control position 20". And as the hydraulic pressure applied to the first fluid port 20a of the valve 20 is subsequently lowered, fluid may be drained from the hydraulic valve actuator 20f and toward the first fluid port 20a via the one-way valve 22. The valve 20 then remains in its second control position 20" when or as long as the hydraulic pressure applied to the hydraulic valve actuator 20f via the first fluid port 20a is equal to or above the second switching threshold pressure which is lower than the first switching threshold pressure.

That is, like in the valve assembly 200 of FIG. 1, in the valve assembly 300 of FIG. 2 the second switching threshold pressure required to keep the valve 20 in the second control position 20" is smaller than the first switching threshold pressure required to switch the valve 20 from the first control position 20' to the second control position 20". In the valve assembly 300 of FIG. 2 the ratio between the first switching threshold pressure and the second switching threshold pressure is based on an active area of the hydraulic valve actuator 20f, and on the properties of the pressure relief valve 21, in particular on a biasing force exerted by the biasing member 21*a* and an active area of the hydraulic actuator 21*b*.

As described above, in the embodiment of the hydraulic circuit 100 depicted in FIGS. 1 and 2 the hydraulic actuator 6 and the hydraulic motor 3 are configured such that when, once or as long as a hydraulic pressure applied to the hydraulic actuator 6 is below the servo threshold pressure, the hydraulic actuator 6 sets the hydraulic displacement of the hydraulic motor 3 to large displacement, and that when, once or as long as a hydraulic pressure applied to the hydraulic actuator 6 is equal to or above the servo threshold pressure, the hydraulic actuator 6 sets the hydraulic displacement of the hydraulic motor 3 to small displacement.

By contrast, in a variation of the hydraulic circuit 100 depicted in FIGS. 1 and 2, the hydraulic actuator 6 and the hydraulic motor 3 may be configured such that when, once or as long as a hydraulic pressure applied to the hydraulic actuator 6 is below the above-mentioned servo threshold pressure, the hydraulic actuator 6 sets the hydraulic displacement of the hydraulic motor 3 to small displacement. And the hydraulic actuator 6 and the hydraulic motor 3 may then further be configured such that when, once or as long as a hydraulic pressure applied to the hydraulic actuator 6 is equal to or above the servo threshold pressure, the hydraulic actuator 6 sets the hydraulic displacement of the hydraulic motor 3 to large displacement.

With respect to the hydraulic circuit 100 of FIGS. 1 and 2 said variation may then include the additional modification that the fluid port 6*c* of the hydraulic actuator 6 may be connected to the third fluid port 20*c* of the valve 20 (rather than to the second fluid port 20*b* as shown in FIGS. 1 and 2), and that the second fluid port 20*b* may be plugged (rather than the third fluid port 20*c* as shown in FIGS. 1 and 2). Or in other words, in the variation of the hydraulic circuit 100 of FIGS. 1 and 2 when the valve 20 is in the first control position 20' it fluidly isolates the first fluid port 20*a* of the valve 20 from the hydraulic actuator 6, and when the valve 20 is in the second control position 20" it fluidly connects the first fluid port 20*a* of the valve 20 to the hydraulic actuator 6.

Based on the above description of the hydraulic circuit 100 of FIGS. 1 and 2 a person of ordinary skill readily appreciates that in the variation described in the two preceding paragraphs when the pressure source 1 is turned off or right after it is turned on and the first fluid port 20*a* of the valve 20 is fluidly isolated from the hydraulic actuator 6, the displacement of the hydraulic motor 3 is set to small displacement. And when, once or as long as the first fluid port 20*a* of the valve 20 is pressurized above the first switching threshold pressure and the first valve 20 is switched to the second control position 20" and fluidly connects the first fluid port 20*a* of the valve 20 to the hydraulic actuator 6, the displacement of the hydraulic motor 3 is set to large displacement.

The invention claimed is:

1. Valve assembly, comprising:
a hydraulically actuated valve configured to be biased from a first control position to a second control position by a hydraulic pressure applied to a first fluid port of the hydraulically actuated valve,
wherein the valve assembly is configured such that a first switching threshold pressure required to switch the hydraulically actuated valve to its second control position when applied to the first fluid port of the hydraulically actuated valve in its first control position differs from a second switching threshold pressure required to keep the hydraulically actuated valve in its second control position when applied to the first fluid port of the hydraulically actuated valve in its second control position.

2. The valve assembly of claim 1, wherein the first switching threshold pressure is higher than the second switching threshold pressure.

3. The valve assembly of claim 1, wherein the hydraulically actuated valve further comprises a biasing member biasing the hydraulically actuated valve to its first control position.

4. The valve assembly of claim 1, wherein the hydraulically actuated valve further comprises a second fluid port, the hydraulically actuated valve in its first control position fluidly connecting the first fluid port of the hydraulically actuated valve to the second fluid port of the hydraulically actuated valve, and the hydraulically actuated valve in its second control position fluidly isolating the first fluid port of the hydraulically actuated valve from the second fluid port of the hydraulically actuated valve.

5. The valve assembly of claim 1, wherein the hydraulically actuated valve comprises at least one hydraulic valve actuator fluidly connected or fluidly connectable to the first fluid port of the hydraulically actuated valve and configured to bias the hydraulically actuated valve to its second control position.

6. The valve assembly of claim 5, wherein the hydraulically actuated valve is configured such that when the hydraulically actuated valve is in its second control position, a hydraulic pressure equal to or higher than the second switching threshold pressure applied to the at least one hydraulic valve actuator of the hydraulically actuated valve keeps the hydraulically actuated valve in its second control position.

7. The valve assembly of claim 5, wherein the at least one hydraulic valve actuator of the hydraulically actuated valve comprises at least one first hydraulic valve actuator and at least one second hydraulic valve actuator, each of the hydraulic valve actuators of the hydraulically actuated valve configured to bias the hydraulically actuated valve to its second control position, wherein the hydraulically actuated valve is configured such that in one of the first control position and the second control position of the hydraulically actuated valve only the at least one first hydraulic valve actuator or only the at least one second hydraulic valve actuator of the hydraulically actuated valve is fluidly connected to the first fluid port of the hydraulically actuated valve, and that in the other of the first control position and the second control position of the hydraulically actuated valve the at least one first hydraulic valve actuator and the at least one second hydraulic valve actuator of the hydraulically actuated valve are fluidly connected to the first fluid port of the hydraulically actuated valve.

8. The valve assembly of claim 7, wherein the hydraulically actuated valve is configured such that in the first control position of the hydraulically actuated valve the at least one first hydraulic valve actuator of the hydraulically actuated valve is fluidly connected to the first fluid port of the hydraulically actuated valve and the at least one second hydraulic valve actuator of the hydraulically actuated valve is fluidly isolated from the first fluid port of the hydraulically actuated valve, and that in the second control position of the hydraulically actuated valve the at least one first hydraulic valve actuator and the at least one second hydraulic valve actuator of the hydraulically actuated valve are fluidly connected to the first fluid port of the hydraulically actuated valve.

9. The valve assembly of claim 8, wherein the hydraulically actuated valve further comprises a third fluid port, wherein the hydraulically actuated valve in its second control position fluidly connects the first fluid port of the hydraulically actuated valve to the second hydraulic valve actuator of the hydraulically actuated valve via the third fluid port of the hydraulically actuated valve.

10. The valve assembly of claim 5, further comprising a pressure relief valve selectively fluidly connecting the first fluid port of the hydraulically actuated valve to the at least one hydraulic valve actuator of the hydraulically actuated valve.

11. The valve assembly of claim 10, wherein the pressure relief valve is configured to fluidly connect the first fluid port of the hydraulically actuated valve to the at least one hydraulic valve actuator of the hydraulically actuated valve when a hydraulic pressure at the first fluid port of the hydraulically actuated valve reaches or exceeds the first switching threshold pressure.

12. The valve assembly of claim 10, wherein the pressure relief valve comprises a biasing member biasing the pressure relief valve to a closed position in which the pressure relief valve blocks a fluid flow between the first fluid port of the hydraulically actuated valve and the at least one hydraulic valve actuator of the hydraulically actuated valve through the pressure relief valve.

13. The valve assembly of claim 10, further comprising a one-way valve selectively fluidly connecting the first fluid port of the hydraulically actuated valve to the at least one hydraulic valve actuator of the hydraulically actuated valve, in parallel to the pressure relief valve, the one-way valve allowing a fluid flow through the one-way valve from the at least one hydraulic valve actuator of the hydraulically actuated valve toward the first fluid port of the hydraulically actuated valve, and the one-way valve blocking a fluid flow through the one-way valve from the first fluid port of the hydraulically actuated valve toward the at least one hydraulic valve actuator of the hydraulically actuated valve.

14. Hydraulic circuit including the valve assembly of claim 1, further comprising a hydraulic actuator such as a hydraulic cylinder fluidly connected or fluidly connectable to the hydraulically actuated valve, in particular to a second fluid port of the hydraulically actuated valve.

15. The hydraulic circuit of claim 14, further comprising a pressure source fluidly connected or fluidly connectable to the first fluid port of the hydraulically actuated valve.

16. The hydraulic circuit of claim 14, further comprising a variable displacement hydraulic motor, wherein the hydraulic actuator is configured to control the displacement of the variable displacement hydraulic motor.

17. The hydraulic circuit of claim 16, wherein the variable displacement hydraulic motor is a two-speed hydraulic motor, the hydraulic actuator configured to discretely switch the two-speed hydraulic motor between a first hydraulic displacement and a second hydraulic displacement.

18. The hydraulic circuit of claim 16, wherein the hydraulic actuator and the variable displacement hydraulic motor are configured such that the hydraulic displacement of the variable displacement hydraulic motor is configured to be decreased by applying a hydraulic pressure equal to or above a servo threshold pressure to the hydraulic actuator, in particular via a second fluid port of the hydraulically actuated valve.

19. The hydraulic circuit of claim 16, further comprising at least one shuttle valve, wherein the variable displacement hydraulic motor has a first fluid port and a second fluid port, and the first fluid port of the hydraulically actuated valve is fluidly connected or selectively fluidly connected to the first fluid port of the variable displacement hydraulic motor and to the second fluid port of the variable displacement hydraulic motor via the at least one shuttle valve configured to fluidly connect the first fluid port of the hydraulically actuated valve to a maximum pressure of a pressure at the first fluid port of the variable displacement hydraulic motor and a pressure at the second fluid port of the variable displacement hydraulic motor.

20. The hydraulic circuit of claim 16, further comprising a work unit such as a winch, the variable displacement hydraulic motor configured to drive the work unit.

\* \* \* \* \*